(12) United States Patent
Bocus et al.

(10) Patent No.: US 8,498,329 B2
(45) Date of Patent: Jul. 30, 2013

(54) MMSE EQUALISER

(75) Inventors: Mohammud Zubeir Bocus, Bristol (GB); Justin Coon, Bristol (GB); Yue Wang, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 442 days.

(21) Appl. No.: 12/566,216

(22) Filed: Sep. 24, 2009

(65) Prior Publication Data

US 2010/0103997 A1 Apr. 29, 2010

(30) Foreign Application Priority Data

Sep. 24, 2008 (GB) .................................. 0817521.8

(51) Int. Cl.
*H03H 7/30* (2006.01)
*H03H 7/40* (2006.01)

(52) U.S. Cl.
USPC ............ 375/229; 375/232; 375/230; 375/316

(58) Field of Classification Search
USPC ............... 375/219, 240.26–240.29, 284, 285, 375/295, 316, 343, 346–349, 229–236
See application file for complete search history.

(56) References Cited

U.S. PATENT DOCUMENTS

| | | | |
|---|---|---|---|
| 7,787,532 B2 * | 8/2010 | Sivanesan et al. | ............ 375/229 |
| 2002/0126740 A1 | 9/2002 | Giannakis et al. | |
| 2004/0120274 A1 | 6/2004 | Petre et al. | |
| 2007/0019712 A1 * | 1/2007 | Sivanesan et al. | ............ 375/143 |
| 2010/0306613 A1 * | 12/2010 | Wu et al. | ....................... 714/752 |

FOREIGN PATENT DOCUMENTS

| GB | 2 433 397 | 9/2008 |
|---|---|---|
| JP | 2003-510884 | 3/2003 |
| JP | 2003-110474 | 4/2003 |
| JP | 2007-300520 | 11/2007 |
| WO | WO 2004/079975 A2 | 9/2004 |
| WO | WO 2007/032497 A1 | 3/2007 |
| WO | WO 2009/022709 A1 | 2/2009 |

OTHER PUBLICATIONS

Tang et al, "An FFT-based Multiuser Detection for Asynchronous Block-Spreading CDMA Ultra Wideband Communication Systems", IEEE International Conference on Communication, May 2005, pp. 2872-2876.*
United Kingdom Search and Examination Report issued Feb. 27, 2009, in Patent Application No. GB0817521.8.
Yang Tang, et al., "An FFT-based Multiuser Detection for Asynchronous Block-Spreading CDMA Ultra Wideband Communication Systems", IEEE International Conference on Communication, May 2005, pp. 2872-2876.

(Continued)

*Primary Examiner* — Sam K Ahn
*Assistant Examiner* — Linda Wong
(74) *Attorney, Agent, or Firm* — Oblon, Spivak, McClelland, Maier & Neustadt, L.L.P.

(57) ABSTRACT

A MMSE equaliser taking into account delays in the reception of signals from plural users. Time delays in reception of signals from plural users may be known or can be measured or estimated and can be used to for the basis for the operation of the equaliser. A low computational complexity version of the equaliser and a regularized equalizer with further reduced complexity for asynchronous reception are also disclosed.

9 Claims, 6 Drawing Sheets

OTHER PUBLICATIONS

R. Liu, et al., "Performance of Asynchronous Multicarrier CDMA Multiuser Receiver over Frequency Selective Multipath Fading Channels", 14th IEEE International Symposium on Personal, Indoor and Mobile Radio Communication Proceedings, 2003, pp. 1536-1540.

Anja Klein, "Data Detection Algorithms Specially Designed for the Downlink of CDMA Mobile Radio Systems", IEEE 47th Vehicular Technology Conference, 1997, pp. 203-207.

Zhengdao Wang, et al., "Wireless Multicarrier Communications", IEEE Signal Processing Magazine, vol. 17, No. 3, May 2000, pp. 29-48.

Shengli Zhou, et al., "Chip-Interleaved Block-Spread Code Division Multiple Access", IEEE Transactions on Communications, vol. 50, No. 2, Feb. 2002, pp. 235-248.

"Performance Comparison of Distributed FDMA and Localised FDMA with Frequency Hopping for EUTRA Uplink", NEC Group, NTT DOCOMO, TSG-RAN WG1 Meeting #42, Aug. 29-Sep. 2, 2005, pp. 1-7.

Dirk Galda, et al., "A Low Complexity Transmitter Structure for OFDM-FDMA Uplink Systems", Proc. of the IEEE Vehicular Technology Conference (VTC), vol. 4, May 2002, pp. 1737-1741.

Stefano Tomasin, et al., "Throughput Efficient Block-Spreading CDMA: Sequence Design and Performance Comparison", Proc. of the IEEE Global Telecommunications Conference (GLOBECOM), Nov.-Dec. 2005, pp. 2276-2280.

Justin P. Coon, "Precoded Block-Spread CDMA with Maximum User Support and Frequency-Domain Equalization", Proc. of the IEEE International Conference on Communications (ICC), Glasgow, 2007, pp. 4082-4086.

Arash Mirbagheri et al., "A Linear MMSE Receiver for Multipath Asynchronous Random-CDMA With Chip Pulse Shaping" IEEE Transactions on Vihicular Technology, vol. 51, No. 5, Sep. 2002, pp. 1072-1086.

Office Action issued Jul. 26, 2012 in Japanese Application No. 2009-218384 (w/English translation).

K.C.B Wavegedara et al., "Space-Time-Coded CDMA Uplink Transmission with MUI-Free Reception", IEEE Transactions on Wireless Communications, Nov. 2005, vol. 4, No. 6, 99. 3095-3105.

J.P. Coon et al., "Minimum mean-square error frequency-domain equalisation in unique-word based single-carriersystems", Electronics Letters, Aug. 5, 2004, vol. 40, No. 16.

Justin P. Coon, "Precoded Block-Spread CDMA with Maximum User Support and Frequency-Domain Equalization", 2007, IEEE International Conference on Communication, Jun. 28, 2007, pp. 4082-4086.

* cited by examiner

MMSE EQUALISER

FIELD OF THE INVENTION

The present invention is directed towards an MMSE equaliser. More particularly the present invention is directed towards a linear MMSE equaliser and towards a low complexity frequency domain linear MMSE equaliser for block CDMA systems operating under conditions where signals from various users are not received synchronously.

BACKGROUND OF THE INVENTION

Code division multiple access (CDMA) is a popular multiple access technique that is used to support multiple users simultaneously in a network. Many variants of CDMA exist, including direct sequence (DS) CDMA, multi-carrier (MC) CDMA, cyclic prefixed (CP) CDMA, and chip interleaved block spread (CIBS) CDMA. In addition to these variations, many receiver architectures are often available for implementation in CDMA systems, such as the well-known RAKE receiver, interference cancellation receivers, and receivers that rely on channel equalisation.

Some CDMA schemes are interference limited; that is to say, as the number of users in the network increases, residual interference caused by each user eventually cripples the network, thus rendering simultaneous multiple accesses nearly impossible. This residual interference generally results from the loss of orthogonality amongst users, which primarily occurs when the channel is temporally dispersive. Several recent developments in block CDMA systems, including so-called 'generalised MC-CDMA' (GMC-CDMA), CIBS-CDMA, single-carrier frequency division multiple access (SC-FDMA; also known as DFT-spread OFDM), a throughput-efficient block CDMA system and configurable schemes have led to multi-user interference (MUI) free transmission techniques.

US 2004120274, incorporated herein by reference, discloses CDMA transceiver techniques for wireless communications.

US 2002126740, also incorporated herein by reference, proposes chip-interleaved, block-spread multi-user communication.

An example of a so-called 'generalised MC-CDMA' (GMC-CDMA) system is described in "Wireless multicarrier communications", Zhendao Wang, Giannakis, G. B., Signal Processing Magazine, Vol. 17, No. 3, pages 29-48, May 2000, incorporated herein by reference.

Shengli Zhou, Giannakis, G. B., Le Martret, C. describe a system using CIBS-CDMA in: "Chip-interleaved block-spread code division multiple access", IEEE Transactions on Communications, Vol. 50, No. 2, pages 235-248, February 2002, incorporated herein by reference.

Single-carrier frequency division multiple access using DFT-spread OFDM is described in "Performance comparison of distributed FDMA and localised FDMA with frequency hopping for EUTRA uplink," NEC Group and NTT DoCoMo, TSG RAN WG1 Meeting 42 R1-050791, August 2005, incorporated herein by reference, and "A low complexity transmitter structure for OFDM-FDMA uplink systems", D. Galda and H. Rohling, in Proceedings of the IEEE Vehicular Technology Conference (VTC), Vol. 4, pages 1737-1741, May 2002, also incorporated herein by reference.

A throughput-efficient block CDMA system has been proposed by S. Tomasin and F. Tosato: "Throughput Efficient Block-Spreading CDMA: Sequence Design and Performance Comparison" in: Proceedings of the IEEE Global Telecommunications Conference (Globecom), November-December 2005, incorporated herein by reference.

In MUI free systems, any number of users—up to a given maximum number—can theoretically transmit simultaneously without causing any degradation in system performance. Beyond this maximum number of allowable users, the system becomes interference limited in a similar manner to other CDMA systems.

Configurable CDMA schemes are disclosed in GB 2 433 397 A and in J. P. Coon; "Precoded Block-Spread CDMA with Maximum User Support and Frequency-Domain Equalization," in Proc. of the IEEE International Conference on Communications (ICC), Glasgow, 2007. These techniques have lead to mulit-user interference (MUI) free transmission techniques. In these systems, any number of users—up to a given maximum number—can theoretically transmit simultaneously without causing any degradation in system performance. Beyond this maximum number of allowable users, the system becomes interference limited in a similar manner to other CDMA systems.

Although many prior art systems can provide MUI free and inter-block interference (IBI) free transmission using the block CDMA techniques, this can generally only be achieved when perfect synchronization of the users can be obtained at the receiver. In practice, signal reception among different users cannot usually be perfectly synchronized due to delays in transmission or the delays from the channel. As a result, residual MUI and IBI will occur. In "A simplified transceiver structure for cyclic extended CDMA system with frequency domain equalization" (Xiaoming Peng, Francois Chin, T. T. Tjhung and A. S. Madhukumar, Proc. Of the Vehicular Technology Conference, 2005, VTC 2005-Spring, 2005 IEEE $61^{st}$, June 2005, p. 1753-1757) the authors propose a method based on the use of a cyclic prefix and a cyclic postfix (or suffix) that can be used in BS-CDMA systems to mitigate the effects of asynchronous reception. This approach, however, requires the additional overhead of long, and frequently spaced, cyclic extensions, thus limiting the bandwidth of the system.

SUMMARY OF THE INVENTION

According to the present invention there is provided a MMSE equaliser for a block spreading code division multiple access (CDMA) system arranged to simultaneously equalise a plurality of asynchronously received signals by taking time delays between said received signals into account. The present MMSE equaliser thus does not operate based on the assumption that all signals to be operated upon are received simultaneously and instead allows further minimisation or elimination of residual MUI and IBI caused by the asynchronous reception when compared to known MMSE equalisers that have been designed for synchronized reception. The equaliser may be linear frequency domain MMSE equaliser operating based a matrix that allows to take MUI and IBI into account in cases where signals from different users are not received simultaneously.

A general way of characterising the operation of the MMSE equaliser for asynchronous reception may be:

$$\tilde{G}_S = M\sigma_{m,i}^2 F \tilde{\mathbf{H}}_m{}^H F^{-1} [M^2 \sigma_{m,i}^2 F \tilde{\mathbf{H}}_m \tilde{\mathbf{H}}_m{}^H F^{-1} + M\sigma_v^2 I + W]^{-1}$$

wherein $\tilde{G}_S$ is the equaliser, M is the total number of users, $\sigma_{m,i}^2$ denotes the signal power of the ith transmitted block of the mth user, F is the FFT matrix, $F^{-1}$ is IFFT matrix ($F^{-1}=F^H$, and will be used interchangeably in the text that follows), $\tilde{\mathbf{H}}_m$, denotes a P×P circulant channel matrix of the mth user containing in its first column the time domain channel taps of the channel used by the mth user, where P is the block length, $\sigma_v^2$ is the noise variance, I is the P×P identity matrix and W denotes a P×P matrix allowing to take into account the MUI and IBI due to the asynchronous reception among the users. $(\bullet)^H$ denotes the Hermitian transpose and $(\bullet)^{-1}$ denotes the matrix inverse.

An equaliser operating according to this equation benefits from computing lower overheads and better performance in asynchronous networks (which will almost always be used in practice), when compared to US 2004120274 and US 2002126740. The advantage of low overhead comes from the fact that the proposed BS-CDMA system utilizes non-redundant pre-coding, whereas the methods disclosed in US 2004120274 and US 2002126740 introduce redundancy during the pre-coding process. An equaliser operating according to the above equation performs better in an asynchronous network as it specifically takes delays in signal reception into account. This is not the case in US 2004120274 and US 2002126740.

The proposed equalisers also benefit from a lower overhead, as non-redundant pre-coding can be used in the proposed invention, and as only a single cyclic prefix (or zero padding extension) may be employed. In contrast, the pre-coding in the above paper by Xiaoming Peng introduces redundancy in the form of the cyclic extension insertion, which is simply used as a buffer to mitigate asynchronous reception.

The matrix W may take a number of different forms and may, for example, comprise representations of channel taps specific to various users of the equaliser. In one general arrangement the matrix W may take the form:

$$W = FD_m^H \left( \begin{array}{l} \sum_{a=1}^{N_a} (\sigma_{a,i}^2 + \sigma_{a,i-1}^2)(A_{4,a}(c_a c_a^H \otimes I)A_{4,a}^H) + \\ \sum_{b=1}^{N_b} (\sigma_{b,i}^2 + \sigma_{b,i+1}^2)(\Delta_{2,b}(c_b c_b^H \otimes I)\Delta_{2,b}^H) \end{array} \right) D_m F^{-1}$$

wherein:
$D_m$ is the dispreading matrix for the synchronised user;
$N_a$ is the number of users from which signals arrive after the arrival of the signal from the synchronised user;
$N_b$ is the number of users from which signals arrive before the arrival of the signal from the synchronised user;
$\sigma_{a,i}$ and $\sigma_{b,i}$ denote the signal power of the ith transmitted block of the ath/bth user respectively;
$A_{4,a}$ is an upper triangular Toeplitz matrix with first row being $[0_{1 \times MP-(L-1+\tau_a-L_{CP})} h_a(L-1) \ldots h_a(L_{CP}-\tau_a+1)]$;
$\Delta_{2,b}$ is a lower triangular Toeplitz matrix with the first column being $[0_{1 \times MP-\tau_b}, -h_b(0), \ldots, -h_b(\tau_b-1)]^T$;
L is the channel length;
$\tau_a$ is a delay between receipt of a signal from the ath user and of a corresponding signal from the synchronized user;
$\tau_b$ is a delay between receipt of a signal from the bth user and of a corresponding signal from the synchronized user;
$L_{CP}$ is the length of a cyclic prefix used;
$h_a(i)$ and $h_b(i)$ denote the ith channel tap for the ath and bth user respectively, where the subscript a is used for the users whose received signal arrives after the arrival of the received signal of the synchronised user; and subscript b is used for the users whose received signal arrives after the arrival of the received signal of the synchronised user;

$c_a$ and $c_b$ are the spreading codes for the ath and bth users respectively; and
$\otimes$ denotes the Kronecker product.

Alternatively or additionally the operation of the MMSE equaliser may be such that equalisation is for channels with independent and identically distributed channel impulse response taps. In this case the matrix W can take the form:

$$W = F\left(\sum_{a=1}^{N_a} \Upsilon_a + \sum_{b=1}^{N_b} \Xi_b\right)F^H$$

wherein:
$\Upsilon_a$ is a diagonal matrix of size P×P, with the first $l_{1,a}$ diagonal elements being $\alpha_{h_a}^2(0), \ldots \alpha_{h_a}^2(l_{1,a}-1)$, and the rest being zeros, where $l_{1,a}=L-L_{CP}+\tau_a-1$;

$$\alpha_{h_a}^2(l) = (\sigma_{a,i}^2 + \sigma_{a,i-1}^2) \sum_{i=0}^{l_{1,a}-l-1} h_a(L-1-i)h_a^*(L-1-i)$$

$\Xi_b$ is a diagonal matrix with the last $\tau_b$ diagonal elements being $\beta_{h_b}^2(0), \ldots, \beta_{h_b}^2(\tau_b-1)$;

$$\beta_{h_b}^2(i) = (\sigma_{b,i}^2 + \sigma_{b,i-1}^2) \sum_{j=0}^{i} h_b(j)h_b^*(j);$$

$N_a$ is the number of users from which signals arrive after the arrival of the signal from the synchronised user;
$N_b$ is the number of users from which signals arrive before the arrival of the signal from the synchronised user;
$\tau_{a,i}$ and $\tau_{b,i}$ denote the signal power of the ith transmitted block of the ath/bth user respectively;
L is the channel length;
$\tau_a$ is a delay between receipt of a signal from the ath user and of a corresponding signal from the synchronized user;
$\tau_b$ is a delay between receipt of a signal from the bth user and of a corresponding signal from the synchronized user;
$h_a(i)$ denotes the ith time domain channel tap of the channel experienced by the ath user; and
$h_b(j)$ denotes the jth time domain channel tap of the channel experienced by the bth user.

Alternatively or additionally the operation of the MMSE equaliser may be such that W has non-zero diagonal components and zero non-diagonal components, the diagonal components all being the same. In this case the matrix W may take the form:

$$W = \xi I$$

where $\xi$ can be the average of the diagonal elements of $\Upsilon_a$ and $\Xi_b$. There are other ways of obtaining $\xi$. For example, $\xi$ can be obtained as a weighted sum of the diagonal elements contained in $\Upsilon_a$ and $\Xi_b$.

One effect achieved by adding the matrix W to the operation of the equaliser is that the bracketed term of the matrix that is to be inverted is regularised. This is advantageous in situation where $\tilde{H}_m \tilde{H}_m^H$ itself is not well defined, for example due to adverse channel conditions.

The present invention also extends to a receiver for a block spread CDMA system comprising any of the above mentioned equalisers. The receiver may further comprise a phase rotation decoder and/or means for estimating and/or setting time delays between received signals. The present invention also extends to a block spread CDMA system comprising any such receiver. Such a CDMA system may further comprise a transmitter with a spreader arranged to spread signals using discrete Fourier transform (DFT) spreading codes. The CDMA system may further comprise a phase rotation pre-coder in a or the transmitter.

According to the present invention there is also provided a method of equalising signals received in a block code division multiple access (CDMA) system, the method comprising equalising a plurality of asynchronously received signals by taking time delays between said received signals into account.

The signals may be equalised according to:

$$\tilde{G}_S = M\sigma_{m,i}^2 F \tilde{\tilde{\mathbf{H}}}_m^H F^{-1} [M^2 \sigma_{m,i}^2 F \tilde{\tilde{\mathbf{H}}}_m \tilde{\tilde{\mathbf{H}}}_m^H F^{-1} + M\sigma_v^2 I + W]^{-1}$$

wherein $\tilde{G}_S$ is the equaliser, M is the total number of users, $\sigma_{m,i}^2$ denotes the signal power of the ith transmitted block of the mth user, F is the FFT matrix, $F^{-1}$ is IFFT matrix, $\tilde{\tilde{\mathbf{H}}}_m$ is the P×P circulant matrix with its first column containing the time domain channel taps of the mth user, where P is the block length, $\tau_v^2$ is the noise variance, I is the P×P identity matrix and W denotes a P×P matrix allowing to take into account the MUI and IBI due to the asynchronous reception among the users.

The matrix W may take a general form, such as:

$$W = FD_m^H \left( \sum_{a=1}^{N_a} (\sigma_{a,i}^2 + \sigma_{a,i-1}^2)(A_{4,a}(c_a c_a^H \otimes I)A_{4,a}^H) + \sum_{b=1}^{N_b} (\sigma_{b,i}^2 + \sigma_{b,i+1}^2)(\Delta_{2,b}(c_b c_b^H \otimes I)A_{2,b}^H) \right) D_m F^{-1}$$

wherein:

$D_m$ is the dispreading matrix for the synchronised user;

$N_a$ is the number of users from which signals arrive after the arrival of the signal from the synchronised user;

$N_b$ is the number of users from which signals arrive before the arrival of the signal from the synchronised user;

$\tau_{a,i}$ and $\tau_{b,i}$ denote the signal power of the ith transmitted block of the ath/bth user respectively;

$A_{4,a}$ is an upper triangular Toeplitz matrix with first row being $[0_{1 \times MP-(L-1+\tau_a-L_{CP})} h_a(L-1) \ldots h_a(L_{CP}-\tau_a+1)]$;

$\Delta_{2,b}$ is a lower triangular Toeplitz matrix with the first column being $[0_{1 \times MP-\tau_b}, -h_b(0), \ldots, -h_b(\tau_b-1)]^T$;

L is the channel length;

$\tau_a$ is a delay between receipt of a signal from the ath user and of a corresponding signal from the synchronized user;

$\tau_b$ is a delay between receipt of a signal from the bth user and of a corresponding signal from the synchronized user;

$L_{CP}$ is the length of a cyclic prefix used;

$h_a(i)$ and $h_b(i)$ denote the ith channel tap for the ath and bth user respectively, where the subscript a is used for the users whose received signal arrives after the arrival of the received signal of the synchronised user; and subscript b is used for the users whose received signal arrives after the arrival of the received signal of the synchronised user;

$c_a$ and $c_b$ are the spreading codes for the ath and bth users respectively; and $\otimes$ denotes the Kronecker product.

The signals may be equalised for channels with independent and identically distributed channel impulse response taps. In this case the matrix W may take the form:

$$W = F \left( \sum_{a=1}^{N_a} \Upsilon_a + \sum_{b=1}^{N_b} \Xi_b \right) F^H$$

wherein:

$\Upsilon_a$ is a diagonal matrix of size P×P, with the first $l_{1,a}$ diagonal elements being $\alpha_{h_a}^2(0), \ldots \alpha_{h_a}^2(l_{1,a}-1)$, and the rest being zeros, where $l_{1,a} = L - L_{CP} + \tau_a - 1$;

$$\alpha_{h_a}^2(l) = (\sigma_{a,i}^2 + \sigma_{a,i-1}^2) \sum_{i=0}^{l_{1,a}-l-1} h_a(L-1-i)h_a^*(L-1-i);$$

$\Xi_b$ is a diagonal matrix with the last $\tau_b$ diagonal elements being $\beta_{h_b}^2(0), \ldots, \beta_{h_b}^2(\tau_b-1)$, where $$\beta_{h_b}^2(i) = (\sigma_{b,i}^2 + \sigma_{b,i-1}^2) \sum_{j=0}^{i} h_b(j)h_b^*(j);$$

$N_a$ is the number of users from which signals arrive after the arrival of the signal from the synchronised user;

$N_b$ is the number of users from which signals arrive before the arrival of the signal from the synchronised user;

$\sigma_{a,i}$ and a $\sigma_{b,i}$ denote the signal power of the ith transmitted block of the ath/bth user respectively;

L is the channel length;

$\tau_a$ is a delay between receipt of a signal from the ath user and of a corresponding signal from the synchronized user;

$\tau_b$ is a delay between receipt of a signal from the bth user and of a corresponding signal from the synchronized user;

$h_a(i)$ denotes the ith time domain channel tap of the channel experienced by the ath user; and $h_b(j)$ denotes the jth time domain channel tap of the channel experienced by the bth user.

Further or alternatively the matrix W may take the form:

$$W = \xi I$$

where $\xi$ can be the average of the diagonal elements of $\Upsilon_a$ and $\Xi_b$.

The present invention also extends to a method for transmitting a signal, comprising spreading signals using discrete Fourier transform (DFT) spreading codes prior to transmission and equalising received signals using any of the above discussed methods.

The present invention also extends to a method for transmitting a signal, comprising pre-coding a signal prior to transmission using a phase rotation pre-coder; and equalising a received signal using any of the above described methods.

The present invention also extends to a signal receiving method that includes any of the above described methods of equalising received signals and decoding received signals using a phase rotation decoder.

DETAILED DESCRIPTION OF PREFERRED EMBODIMENTS

When perfect synchronization is assumed at the receiver, the operation of conventional. MMSE equalisers for the mth user in block spread CDMA systems can be described by:

$$\tilde{G}_S = M\sigma_{m,j}^2 F \tilde{H}_m^H F^{-1} [M^2 \sigma_{m,i}^2 F \tilde{H}_m \tilde{H}_m^H F^{-1} + M\sigma_v^2 I]^{-1} \quad (1)$$

wherein $\tilde{G}_S$ is the equaliser, M is the total number of users, $\sigma_{m,i}^2$ denotes the signal power of the ith transmitted block of the mth user, F is the FFT matrix, $F^{-1}$ is IFFT matrix, $\tilde{H}_m$ in denotes a P×P circulant channel matrix of the mth user, where P is the block length, $\sigma_v^2$ is the noise variance and I is the P×P identity matrix. As the FFT matrix is a unitary matrix its inverse $F^{-1}$ corresponds to its Hermitian transpose, so that $F^H = F^{-1}$. The two notations will be used interchangeably in the following.

As discussed above, the operation of such conventional block spread CDMA systems is based on the assumption that the signals received from the users of a CDMA system are received synchronously. If a block CDMA system could be operated in a manner that fulfils this condition, then such conventional equalisers could be operated in a multiple user interference (MUI) and inter-block interference (IBI) free manner. In particular, when signal reception among users is synchronized, conventional zero-forcing (ZF) or MMSE equalisers can be used to suppress the inter-symbol interference.

In practical cases where the signal reception cannot be perfectly synchronized, MUI and IBI may occur, for example when the length of cyclic prefix $L_{CP}$ is not long enough to cover the channel delay spread and the delay in reception for a given user, i.e., when $L_{CP} < L + \tau$ where L is the length of the discrete channel and $\tau$ is the absolute value of the delay for this given users compared to the synchronized user MUI and IBI for that user will occur.

Figure 1:
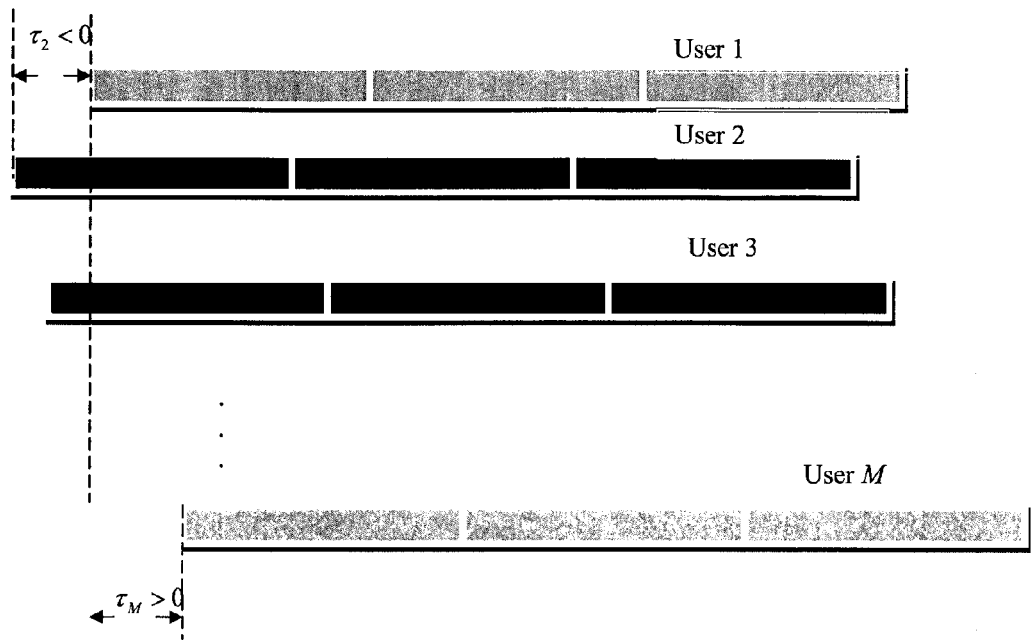
FIG. 1 illustrates sequences of data block received for a number of users.

FIG. 1 depicts three data blocks 10/20/30/40 respectively received from each of a first, a second, a third to an mth user. The first user is considered as providing the time frame based on which the arrival of the signals from the second to the mth user is measured. In this example the first user is referred to as the synchronised user. Two scenarios are depicted. In a first scenario a signal from a user is received before the signal from the synchronised user is received. In the second scenario a signal is received after the signal from the synchronised user is received. The time delay between the receipt of a signal from the synchronised user and a signal from the kth user is $\tau_K$. $\tau_K$ can be positive or negative. For all users, the case where $\tau_k$ is an integer multiple of the symbol interval, for example, $\tau_k = \pm T, \pm 2T, \ldots$ is considered, where T is the time duration of one time domain symbol. In particular when the discrete signal is considered and T=1 is assumed, $\tau_k$ take the integer values and $\tau_k = \pm 1, \pm 2, \ldots$.

As can be seen from FIG. 1, signals from some user, the second and third user in this case, are received earlier than the signal from the synchronised user. In the case of the second user the signal 20 is received with a negative time delay $\tau_2$. The signal 40 from the mth user in contrast is received with a positive time delay $\tau_M$.

Figure 2:
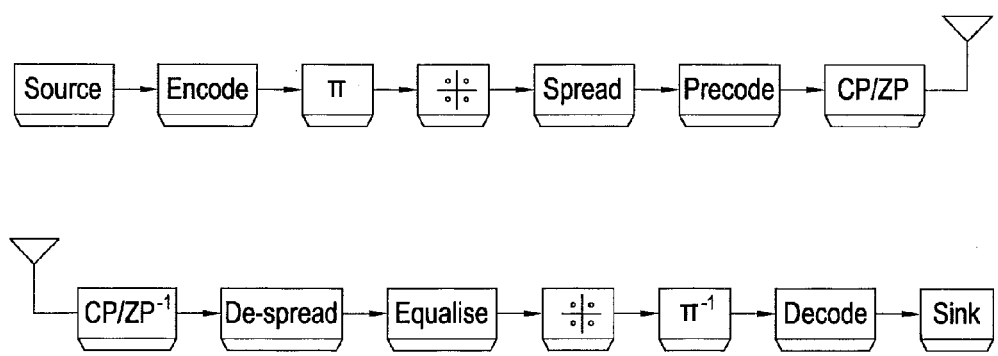
FIG. 2 shows known transmitter and receiver systems.
Figure 3:
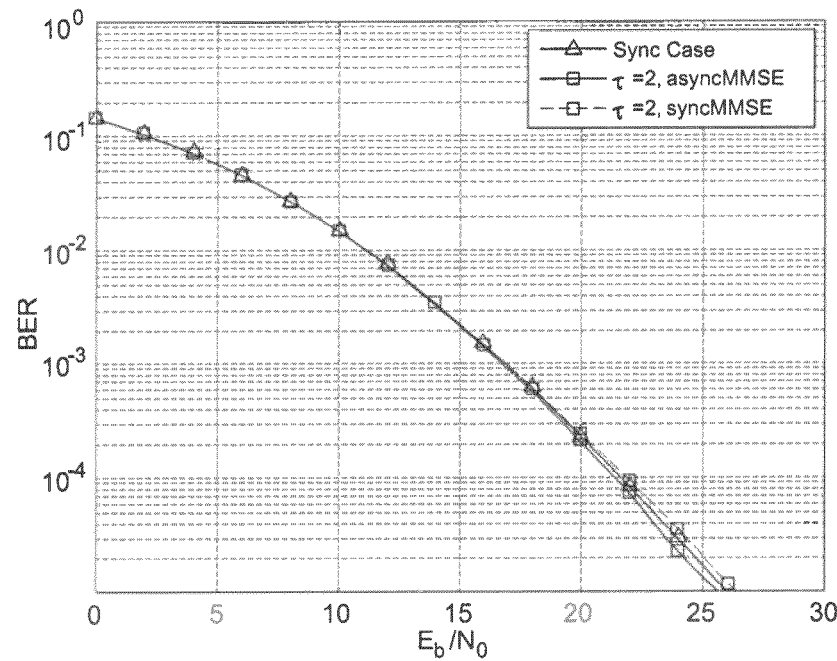
FIG. 3 compares the performance of a known synchronised MMSE equaliser with the performance of a first asynchronous MMSE equaliser in accordance with the present invention, for sixteen users transmitting on exponentially decay channels, wherein fifteen user signals are received after the signal received from a synchronised user.
Figure 4:
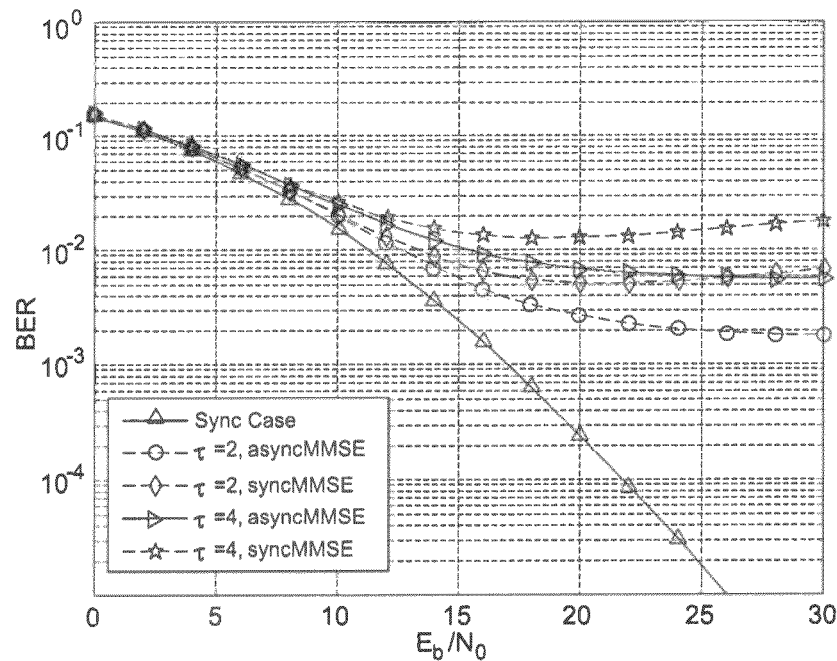
FIG. 4 compares the performance of a known synchronised MMSE equaliser with the performance of a first asynchronous MMSE equaliser in accordance with the present invention, for sixteen users transmitting on exponentially decay channels, wherein fifteen user signals are received before the signal received from a synchronised user.
Figure 5:
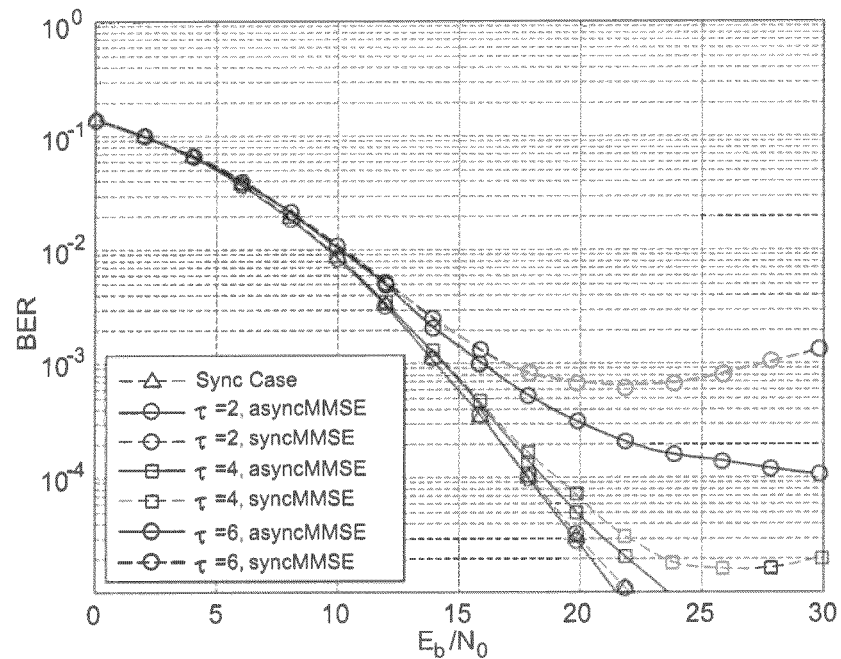
FIG. 5 compares the performance of a known synchronised MMSE equaliser with the performance of a first asynchronous MMSE equaliser in accordance with the present invention, for sixteen users transmitting on Rayleigh fading channels, wherein fifteen user signals are received after the signal received from a synchronised user.

Transmitter and receiver systems constituting an exemplary conventional block spread CDMA system are shown in FIG. 2. The transmitter and receiver systems shown in FIG. 2 correspond to those disclosed in GB 2 433 397 A, which is incorporated herein by reference in its entirety.

Under the operating conditions shown in FIG. 1, using the conventional equalisers provided in (1) results in error floors in the bit error rate (BER) performance for block spread CDMA systems with imperfect synchronization (or asynchronous reception) because MUI and IBI introduced by the asynchronous reception cannot be effectively suppressed by using the conventional equalisers. Equalisers according to embodiments of the present invention takes into account of the MUI and IBI due to the asynchronous reception among users by operating based on the following equation:

$$\tilde{G}_S = M\sigma_{m,j}^2 F \tilde{H}_m^H F^{-1} [M^2 \sigma_{m,i}^2 F \tilde{H}_m \tilde{H}_m^H F^{-1} + M\sigma_v^2 I + W]^{-1} \quad (2)$$

wherein W denotes a P×P matrix allowing to take into account the MUI and IBI due to the asynchronous reception among the users. The matrix W can take a number of different forms, examples of which will be described in the following.

(1) MMSE Equaliser for Asynchronous Reception

Consider a block CDMA system with a total of M users. Considering the case where there are $N_a$ users' signals arriving later than the synchronized user's signal and $N_b$ users' signals arriving prior to the synchronized user's signal, the ith received block can be written as $$r_i = \tilde{H}_m x_{m,i} + \sum_{a=1}^{N_a}\left(\tilde{H}_a x_{a,i} + \Delta_{1,a} x_{a,i} + A_{4,a} x_{a,i-1}\right) + \sum_{b=1}^{N_b}\left(\tilde{H}_b x_{b,i} + \Delta_{2,b} x_{b,i} + \gamma_b x_{b,i+1}\right) + v_i \quad (3)$$

wherein:

$x_{m,i}$, $x_{a,i}$ and $x_{b,i}$ denote the ith transmitted block of the synchronised (mth), ath and bth user respectively;

$\tilde{H}_m$, $\tilde{H}_a$ and $\tilde{H}_b$ denote the MP×MP circulant channel matrices of the synchronised (mth), ath and bth users respectively, where the circulant matrix of a given user contains the discrete time domain channel of that user in its first column;

$\Delta_{1,a}$ is an MP×MP matrix with non-zero entries only in columns MP−(L+$\tau_a$)+2 to MP−$L_{CP}$, with $\tau_a$ being the delay of the ath user compared to the synchronized user;

$$\Delta_{1,a} = \begin{bmatrix} & -h_a(L-1) & \cdots & -h_a(L_{CP}-\tau_a+1) & \\ 0_{MP\times MP-(L+\tau_a)+1} & & \ddots & \vdots & 0_{MP\times L_{CP}} \\ & & & -h_a(L-1) & \\ & & & 0 & \end{bmatrix}$$

wherein $h_a(i)$ denotes the ith channel tap for the ath user;

$A_{4,a}$ is an upper triangular Toeplitz matrix containing the last $L_{CP}$−$\tau_a$−L+1 taps of the time domain channel of the ath user in its first row, i.e., the first row of $A_{4,a}$ is $[0_{1\times MP-(L-1+\tau_a-L_{CP})} h_a(L-1) \ldots h_a(L_{CP}-\tau_a+1)]$;

$\Delta_{2,b}$ is a lower triangular Toeplitz matrix with the first column having the first $\tau_b$ time domain channel taps of the bth user on the last $\tau_b$ entries of the said column, i.e., the first column of $\Delta_{2,b}$ is $[0_{1\times MP-\tau_b}, -h_b(0), \ldots, -h_b(\tau_b-1)]^T$ where $\tau_b$ is the absolute value of the delay of the bth user;

$Y_b$ is a MP×MP matrix with $$\gamma_b = \begin{bmatrix} & 0 & & \\ & h_b(0) & & \\ 0_{MP\times MP-L_{CP}} & \vdots & \ddots & 0_{MP\times(L_{CP}-\tau_b)} \\ & h_b(\tau_b-1) & \cdots & h_b(0) \end{bmatrix} ; \text{ and}$$

wherein $\tau_b$ is the delay of the bth user compared to the synchronised user, and $v_i$ is the equivalent noise term after CP removal.

At the receiver, after the removal of the CP, dispreading, transformation into the frequency domain with an FFT, frequency domain equalization and transformation back into the time domain with an IFFT, the resulting signal $z_i$ can be written as:

$$z_i = F^H \tilde{G} F M \tilde{H}_m s_{m,i} + \sum_{a=1}^{N_a}\left(\begin{array}{l} F^H \tilde{G} F D_m^H \Delta_{1,a}(c_a \otimes \Lambda_a) s_{a,i} + \\ F^H \tilde{G} F D_m^H A_{4,a}(c_a \otimes \Lambda_a) s_{a,i-1} \end{array}\right) + \sum_{b=1}^{N_b}\left(\begin{array}{l} F^H \tilde{G} F D_m^H \Delta_{2,b}(c_b \otimes \Lambda_b) s_{b,i} + \\ F^H \tilde{G} F D_m^H \gamma_b(c_b \otimes \Lambda_b) s_{b,i+1} \end{array}\right) + F^H \tilde{G} F D_m^H v_i \quad (4)$$

where $D_m$ is the dispreading matrix for the mth user (the synchronized user), $\tilde{H}_m$ is the P×P circulant matrix with its first column containing the time domain channel taps of the mth user, $\tilde{G}$ describes the operation of the equaliser to be designed, $s_{m,i}$ is the ith block transmitted from the synchronised user, namely the mth user $s_{a,i}$ and $s_{b,i}$ denote the ith block transmitted from the ath and bth user respectively and $\Lambda_a$ and $\Lambda_b$ are the diagonal matrices containing the frequency domain channel coefficients of the channels experienced by the ath user and the bth user on the diagonal elements. Moreover, $c_a$ and $c_b$ denote the spreading codes for the ath and bth users respectively, and $\otimes$ denotes the Kronecker product.

An MMSE Equaliser minimizes the mean-squared error (MSE) given by:

$$\text{MSE}==\epsilon = E\{tr\{(s_i-z_i)(s_i-z_i)^H\}\} \quad (5)$$

where $s_i$ is the ith transmitted block of the synchronized user, namely the mth user (note that the subscript m has been omitted for brevity). Having $z_i$ and taking the derivative of $\epsilon$ with respect to the equaliser to be designed ($\tilde{G}$ in equation (4)), the optimal MMSE equaliser is derived such that the derivative calculated is zero. The MMSE Equaliser according to a first embodiment of the present invention that takes account of the asynchronous reception among users can thereby be obtained as:

$$\tilde{G} = M\sigma_{m,i}^2 F \tilde{H}_m^H F^{-1} \times \quad (6)$$

$$\begin{bmatrix} M^2\sigma_{m,i}^2 F \tilde{H}_m \tilde{H}_m^H F^{-1} + M\sigma_v^2 I + \\ FD_m^H \left\{ \begin{array}{l} \sum_{a=1}^{N_a}(\sigma_{a,i}^2+\sigma_{a,i-1}^2)(A_{4,a}(c_a c_a^H \otimes I)A_{4,a}^H) + \\ \sum_{b=1}^{N_b}(\sigma_{b,i}^2+\sigma_{b,i+1}^2)(\Delta_{2,b}(c_b c_b^H \otimes I)\Delta_{2,b}^H) \end{array}\right\} D_m F^{-1} \end{bmatrix}^{-1}$$

Note that the matrices, $\Delta_{2,b}$, and $A_{4,a}$ are comprised of the values of the channel taps. Note that it is assumed that the relative delays of all users are known at the receiver of this embodiment. These delays can be estimated, for example by using a control channel and an algorithm whereby the mobile stations sequentially transmit pilot signals to the base station, which in turn determines the timing offset from the ideal synchronization for each signal. A predetermined delay for each signal may also be deliberately set by the CDMA system. The equaliser in equation (6) minimizes the MSE in an asynchronous system.

It will be appreciated that equation (6) corresponds to equation (2) if W is:

$$W = FD_m^H \begin{pmatrix} \sum_{a=1}^{N_a} (\sigma_{a,i}^2 + \sigma_{a,i-1}^2)(A_{4,a}(c_a c_a^H \otimes I)A_{4,a}^H) + \\ \sum_{b=1}^{N_b} (\sigma_{b,i}^2 + \sigma_{b,i+1}^2)(\Delta_{2,b}(c_b c_b^H \otimes I)\Delta_{2,b}^H) \end{pmatrix} D_m F^{-1} \quad (7)$$

Equalisers operating according to equation (7) are not restricted to use in systems where specific spreading codes or pre/decoders are used. Instead such equalisers can be employed with any pre-coder and spreading code.

(2) Low Complexity MMSE Equaliser for Asynchronous Reception

Assuming the channel impulse response taps are independent and identically distributed (i.i.d.) with the channel variance being $\sigma_h^2$, low complexity MMSE Equaliser can be derived. In this case, the MSE of the received signal given by equation (5) is calculated by taking the expectation over the data, noise, and channel random variables. Thus, the second-order statistics of the channels are used to design the equaliser, rather than the actual channel realisations. It is noted that in this case, discrete Fourier transform (DFT) spreading codes and phase-rotation precoders and decoders are advantageously employed to exploit the low complexity advantage.

It is known that the matrix $A_{4,a}$ can be decomposed as:

$$A_{4,a} = \theta_{1,a} \otimes \theta_{2,a}$$

where $\theta_{1,a}$ is an M×M identity matrix shifted to the right by M−1 positions and $\theta_{2,a}$ is a P×P upper triangular Toeplitz matrix with its first row being $[0_{1\times(P-l_1)} h(L-1) \ldots h(L_{CP}-\tau_a+1)]$, where $l_1 = L-1+\tau_a-L_{CP}$.

Moreover, $\Delta_{2,b}$ can be decomposed as $$\Delta_{2,b} = \Phi_{1,b} \otimes \Phi_{2,b}$$

where $\Phi_{1,a}$ is an M×M identity matrix shifted to the right by M−1 positions and $\Phi_{2,a}$ is a P×P lower triangular Toeplitz matrix with first column being $[0_{1\times(P-\tau_b)} -h(0) \ldots -h(\tau_b-1)]^T$.

Following these decompositions, the MSE can be computed, and the low complexity equaliser that minimizes the MSE for the equaliser according to a second embodiment of the present invention can be obtained as:

$$\tilde{G} = M\sigma_{m,i}^2 F\tilde{H}_m^H F^{-1} \times \begin{bmatrix} M^2 \sigma_{m,i}^2 F\tilde{H}_m \tilde{H}_m^H F^H + \\ F\left(\sum_{a=1}^{N_a} \Upsilon_a + \sum_{b=1}^{N_b} \Xi_b\right) F^H + M\sigma_v^2 I \end{bmatrix}^{-1} \quad (8)$$

where $\Upsilon_a$ is a diagonal matrix of size P×P, with the first $l_{1,a}$ diagonal elements, being $\alpha_{h_a}^2(0), \ldots \alpha_{h_a}^2(l_{1,a}-1)$, and the rest being zeros, where $l_{1,a} = L - L_{CP} + \tau_a - 1$;

$$\alpha_{h_a}^2(l) = (\sigma_{a,i}^2 + \sigma_{a,i-1}^2) \sum_{i=0}^{l_{1,a}-l-1} h_a(L-1-i) h_a^*(L-1-i);$$

$\Xi_b$ is a diagonal matrix with the last $\tau_b$ diagonal elements being $\beta_{h_b}^2(0), \ldots, \beta_{h_b}^2(\tau_b-1)$, where $$\beta_{h_b}^2(i) = (\sigma_{b,i}^2 + \sigma_{b,i-1}^2) \sum_{j=0}^{i} h_b(j) h_b^*(j).$$

Note that $\Upsilon_a$ and $\Xi_b$ in equation (8) contain channel taps due to different user. It will be appreciated the equalizer described by equation (8) also applies to the case where the channel taps are be identical for all users, i.e., $h = h_a = h_b$.

It will be appreciated that equation (8) corresponds to equation (2) if W is:

$$W = F\left(\sum_{a=1}^{N_a} \Upsilon_a + \sum_{b=1}^{N_b} \Xi_b\right) F^H \quad (9)$$

Let $M^2 \sigma_{m,i}^2 F\tilde{H}_m \tilde{H}_m^H F^H + M\sigma_v^2 I = A$ and $$\sum_{a=1}^{N_a} \Upsilon_a + \sum_{b=1}^{N_b} \Xi_b = B,$$

the matrix inversion in the low complexity equaliser can be written as $C^{-1} = [A + FBF^H]^{-1}$, where B takes the form:

$$\sum_{a=1}^{N_a} \begin{bmatrix} \alpha_h^2(0) & 0 & \ldots & & \ldots & \ldots & 0 \\ 0 & \ddots & & & & & \vdots \\ \vdots & & \alpha_h^2(l_{1,a}-1) & & & & \vdots \\ \vdots & & & 0 & & & \vdots \\ \vdots & & & & \ddots & & \vdots \\ 0 & \ldots & \ldots & & \ldots & \ldots & 0 \end{bmatrix} +$$

$$\sum_{b=1}^{N_b} \begin{bmatrix} 0 & 0 & \ldots & & \ldots & & 0 \\ 0 & \ddots & & & & & \vdots \\ \vdots & & 0 & & & & \vdots \\ \vdots & & & \beta_h^2(0) & & & \vdots \\ \vdots & & & & & \ddots & 0 \\ 0 & \ldots & \ldots & & \ldots & 0 & \beta_h^2(\tau_b-1) \end{bmatrix}$$

It is noted that the number of non-zero entries on the diagonal of B is the sum of max $\{l_{1,a}\}$ and max $\{\tau_b\}$. Thus the matrix product $FBF^H$ can be decomposed into the max $\{l_{1,a}\} + \max \{\tau_b\}$ products as shown below:

$$F\mathrm{diag}\left(\sum_{a=1}^{N_a} \alpha_{h_a}^2(0), 0, \ldots, 0\right) F^{-1} + F\mathrm{diag}\left(\sum_{a=1}^{N_a} \alpha_{h_a}^2(1), 0, \ldots, 0\right) F^{-1} + \quad (10)$$

$$\ldots + F\mathrm{diag}\left(0, \ldots, 0, \sum_{a=1}^{N_a} \alpha_{h_a}^2(l_{1_a}-1), 0, \ldots, 0\right) F^{-1} +$$

$$F\mathrm{diag}\left(0, \ldots 0, \sum_{b=1}^{N_b} \beta_{h_b}^2(1), 0, \ldots, 0\right) F^{-1} +$$

$$\ldots + F\mathrm{diag}\left(0, \ldots, 0, \sum_{b=1}^{N_b} \beta_{h_b}^2(\tau_b-1)\right) F^{-1}$$

In each of the products in (10), the diagonal matrix contains only one non-zero value. Taking this into account, each product can be represented by a vector product $$\sum_{a=1}^{N_a} \alpha_{h_a}^2(i) f_i f_i^H$$

for those users arriving after the synchronized user and $$\sum_{b=1}^{N_b} \beta_{h_b}^2(i) f_{P-\tau_b+i+1} f_{P-\tau_b+i+1}^H$$

for those before the synchronized user, where $f_i$ represents the $i^{th}$ column of a P×P DFT matrix. Therefore, C can be rewritten as:

$$C = A + \sum_{i=1}^{Q} k_i u_i u_i^H$$

where:

$$Q = \max\{l_{1,a}\} + \max\{\tau_b\}$$

$$k_i = \sum_{a=1}^{N_a} \alpha_{h_a}^2(i), u_i = f_i, \text{ for } i = [1, \max\{l_{1,a}\}] \text{ and}$$

$$k_i = \sum_{b=1}^{N_b} \beta_{h_b}^2(i), u_i = f_{P-\tau_b+i+1}, \text{ for } i = [\max\{l_{1,a}\} + 1, \max\{\tau_b\}].$$

Reduced complexity can be achieved by simplifying the computation of the matrix inverse using the matrix inversion lemma below:

Matrix Inversion Lemma

If a matrix C is defined as $C=A+xy^H$, is possible to calculate its inverse as:

$$C^{-1} = (A + xy^H)^{-1} = A^{-1} - \frac{A^{-1} xy^H A^{-1}}{1 + y^H A^{-1} x} \quad (11)$$

Applying the matrix inversion lemma, a recursive approach can be used to compute the matrix inverse needed in the equaliser design. The matrix is $$B = \sum_{i=1}^{Q} k_i u_i u_i^H$$

broken down into Q additions, and the matrix inversion can be computed by repeating (11) Q times. Specifically, the matrix $A_i$ in the ith iteration is updated after each computation and $A_{i+1} = A_i + k_i f_i f_i^H$; where k is a constant term, i is the iteration index, $A_1 = A$, and $A_{Q+1} = C$. Following (11), the inverse of C can therefore be obtained as:

$$C^{-1} = (A_Q + k_Q u_Q u_Q^H)^{-1} = A_Q^{-1} - \frac{A_Q^{-1} k_Q^2 u_Q u_Q^H A_Q^{-1}}{1 + k_Q^2 u_Q^H A_Q^{-1} u_Q} \quad (12)$$

and the inverse of $A_Q$ is obtained by recursively applying (12).

Since A is diagonal, the inverse of A can be easily obtained. The computational complexity required to compute the inverse of a matrix with large dimension can therefore be greatly reduced, especially when the individual delays of the asynchronous users are small.

(3) Equaliser for Asynchronous Reception with Further Reduced Complexity

The complexity of the equaliser can be further reduced noting that $Y_a$ and $\Xi_b$ in the addition term:

$$\sum_{a=1}^{N_a} Y_a + \sum_{b=1}^{N_b} \Xi_b \quad (13)$$

of the low complexity equaliser described above with regard to a second embodiment of the present invention and operating according to equation (8) are both diagonal matrices. The term in the addition term (9) is therefore diagonal, with the diagonal elements being:

$$\eta_0, \eta_1, \ldots, \eta_{max\{l_{1,a}-1\}}, 0, 0, \ldots 0, v_1, v_2, \ldots, v_{max\{\tau_b\}},$$

where $\eta_0, \eta_1, \ldots, \eta_{max\{l_{1,a}-1\}}$, are obtained by the first summation term and $v_1, v_2, \ldots, v_{max\{\tau_b\}}$ are obtained by the second summation term.

Assuming the averages of these diagonal elements are $\zeta$, and replacing each diagonal element in (13) with $\xi$, the addition term (9)/(13) can be rewritten as $\xi I$, and an equaliser with yet further reduced complexity is obtained as:

$$\tilde{G}_S = M\sigma_{m,i}^2 F \tilde{H}_m^H F^{-1} [M^2 \sigma_{m,i}^2 F \tilde{H}_m \tilde{H}_m^H F^{-1} + \xi I + M\sigma_v^2 I]^{-1} \quad (14)$$

As the matrix inverse is simply applied to a diagonal matrix in (14), the complexity of computing the equaliser is greatly reduced.

It will be appreciated that equation (14) corresponds to equation (2) if W is:

$$W = \xi I \quad (15)$$

Not all of the values on the diagonal of W in the second embodiment (equation (9)) were non-zero, while all of the diagonal values of I in equation (15) are non-zero. Moreover, the diagonal entries in matrix W in the third embodiment are the same. These facts inevitably limit the performance of an equaliser operating according to equation (14) when compared to an equaliser operating according to either equation (7) or equation (9). The addition of the term W to equation (1), as shown in equation (2), however, provides an additional regularisation term in the brackets in equation (2). Thus, should the term $\tilde{H}_m \tilde{H}_m^H$ in equations (1)/(2) be poorly defined, as may be the case for source channel conditions encountered in practice, then the regularisation function of the additional matrix W improves the definition of the bracketed term in equation (2), even in cases where a modified identity matrix is employed for this purpose, as proposed by equations (14) and (15). $\xi$ thus acts as an additional regularization factor for the conventional MMSE Equaliser defined in equation (1) above. The method of obtaining $\xi$ given above hereby simply provides on possible example and can take values different from those mentioned above without increasing the complexity of the equaliser defined by equation (14).

It should also be noted that equalisers operating according to equation (14) are not restricted to use in systems where specific spreading codes or pre/decoders are used. Instead such equalisers can be employed with any precoder and spreading code.

PERFORMANCE EXAMPLES

Examples of the performance of uncoded block CDMA system using the proposed linear MMSE Equaliser are presented in FIGS. 3 to 11, each of which plots the Bit Error Rate (BER) of a received signal against the signal to noise ratio ($E_b/N_0$) of the signal. FIGS. 3 to 6 relate to an equaliser operating according to equation (6). FIGS. 7 to 10 relate to an equaliser operating according to equation (8) and FIG. 11 relates to an equaliser operating according to equation (14).

Each of the Figures relates to a scenario where signals from sixteen active users are received. One of these active users is the synchronised user. Signals from the remaining fifteen user are received either after corresponding signals from the synchronised user have been received (this applies to FIGS. 3, 3, 5, 7 and 9) or before corresponding signals from the synchronised user have been received (this applies to FIGS. 4, 6, 8, 10 and 11). FIGS. 3, 4, 7, 8 and 11 are simulation results based on the assumption that the signals are transmitted through exponentially decay channels, while FIGS. 5, 6, 9 and 10 are simulation results based on the assumption that the signals are transmitted through i.i.d Rayleigh Fading channels.

The lines in FIGS. 3 to 11 labelled 'Sync Case' illustrates the case where all signals are received synchronously, that is the case in which the above discussed assumption on which known equalisers are based is true. These lines thus illustrate the best achievable performance of an MMSE equaliser in block CDMA systems where the received signals of different users are perfectly synchronized. The lines labelled 'synchMMSE equaliser' indicate the performance of a known MMSE equaliser, that is an MMSE equaliser operating based on the assumption that all signals are received synchronously, wherein the signals are, however, received with a time delay τ, as is the case in real life scenarios. The lines labelled 'asynchMMSE equaliser' relate to the performance of MMSE equalisers operating according to equation (6) and subject to the time delays τ noted in the figures. The lines labelled 'low comp. Equaliser' in FIGS. 7 to 11 relate to the performance of an MMSE equaliser operating according to equation (8). The line labelled 'lowest complx' in FIG. 11 relates to an MMSE equaliser operating according to equation (14). For simplicity of computation the time delays τ noted in the figures were chosen to be the same for all of the fifteen other/non-synchronised users, and is the absolute value of the delays.

Figure 6:
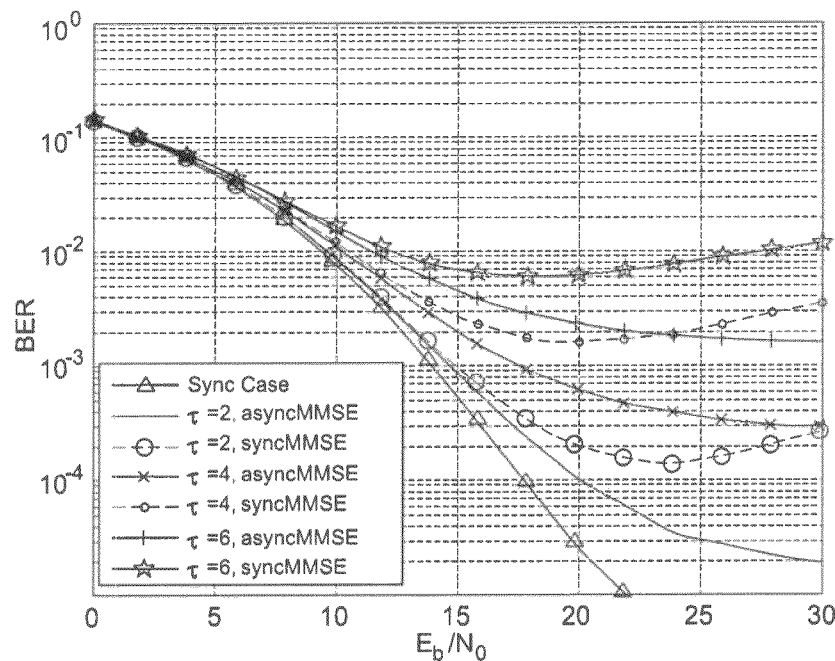
FIG. 6 compares the performance of a known synchronised MMSE equaliser with the performance of a first asynchronous MMSE equaliser in accordance with the present invention, for sixteen users transmitting on Rayleigh fading channels, wherein fifteen user signals are received before the signal received from a synchronised user.
Figure 7:
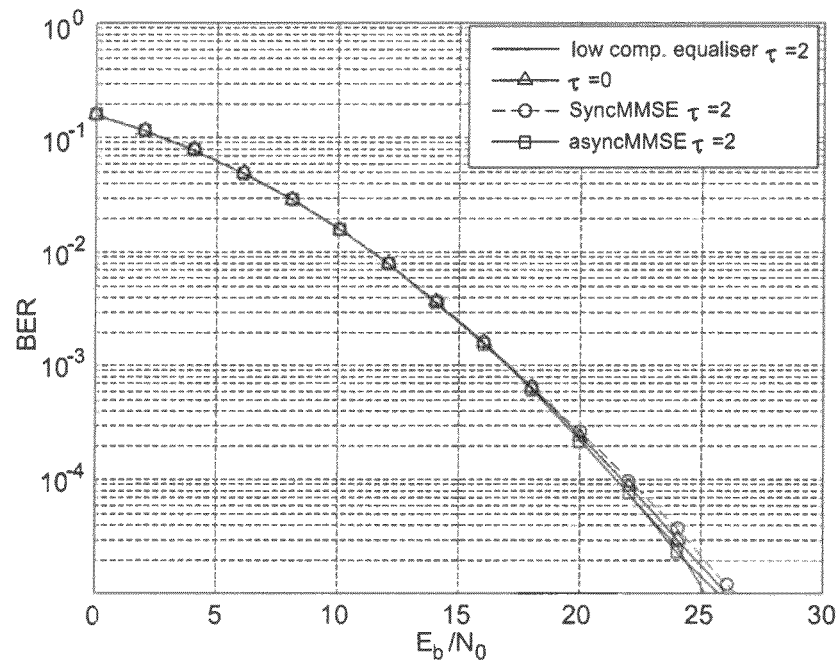
FIG. 7 compares the performance of a known synchronised MMSE equaliser with the performance of a second asynchronous MMSE equaliser in accordance with the present invention, for sixteen users transmitting on exponentially decay channels, wherein fifteen user signals are received after the signal received from a synchronised user.
Figure 8:
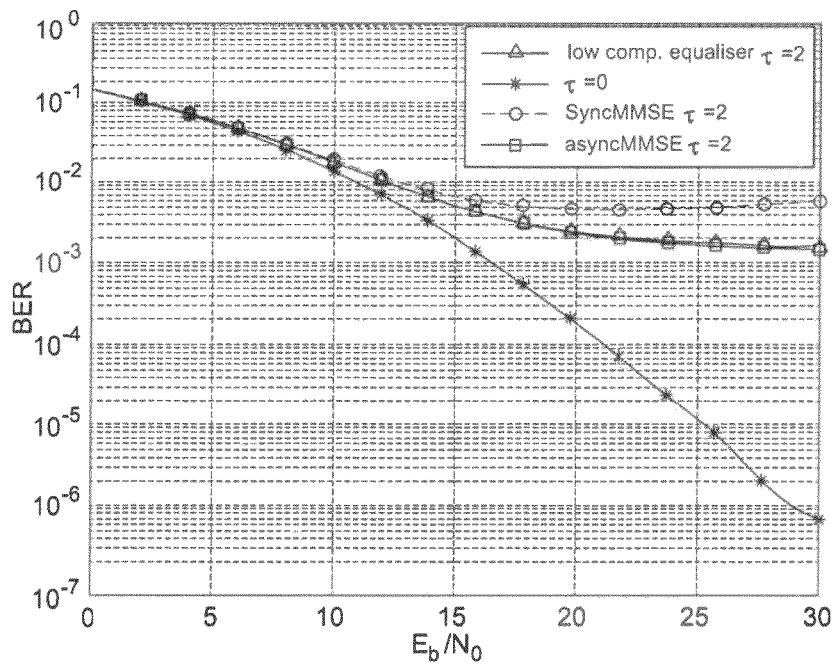
FIG. 8 compares the performance of a known synchronised MMSE equaliser with the performance of a second asynchronous MMSE equaliser in accordance with the present invention, for sixteen users transmitting on exponentially decay channels, wherein fifteen user signals are received before the signal received from a synchronised user.
Figure 9:
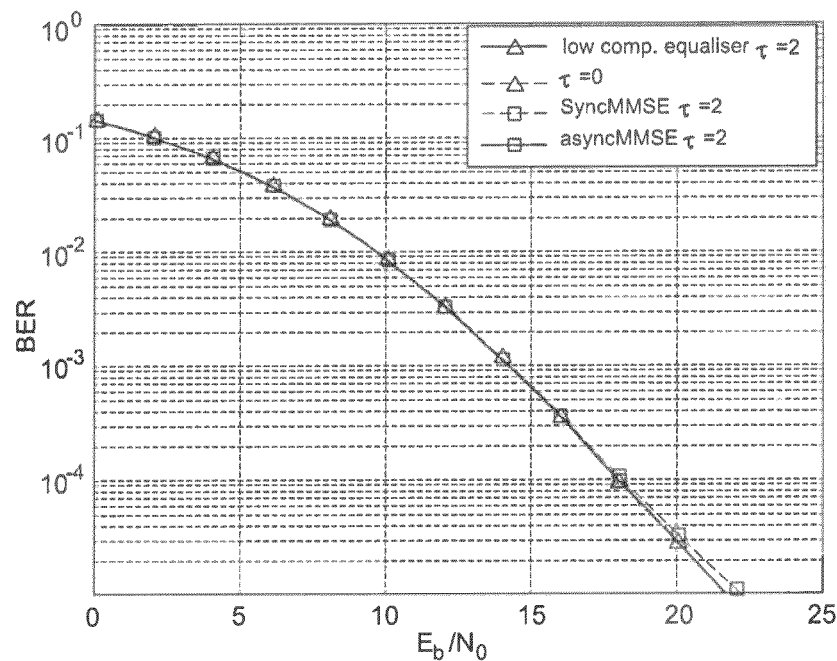
FIG. 9 compares the performance of a known synchronised MMSE equaliser with the performance of a second asynchronous MMSE equaliser in accordance with the present invention, for sixteen users transmitting on Rayleigh fading channels, wherein fifteen user signals are received after the signal received from a synchronised user.
Figure 10:
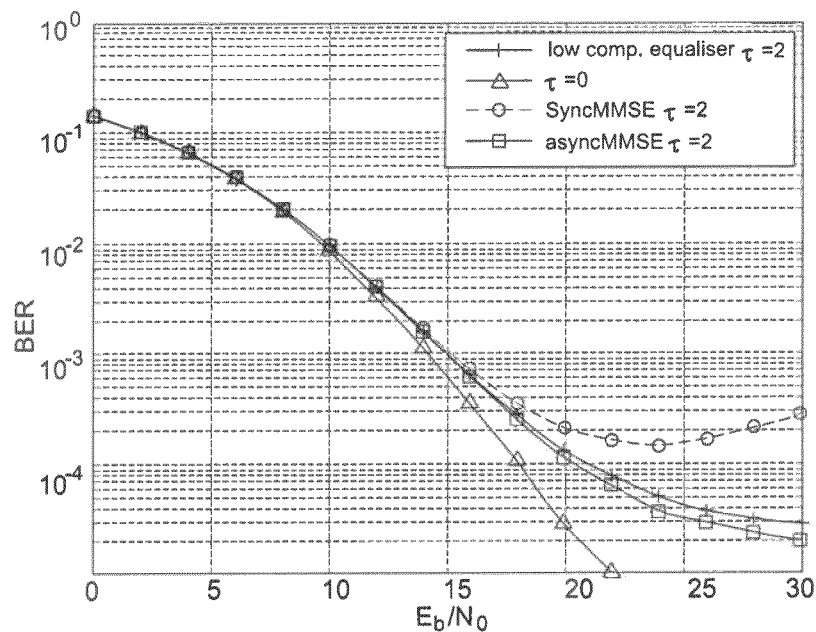
FIG. 10 compares the performance of a known synchronised MMSE equaliser with the performance of a second asynchronous MMSE equaliser in accordance with the present invention, for sixteen users transmitting on Rayleigh fading channels, wherein fifteen user signals are received before the signal received from a synchronised user.
Figure 11:
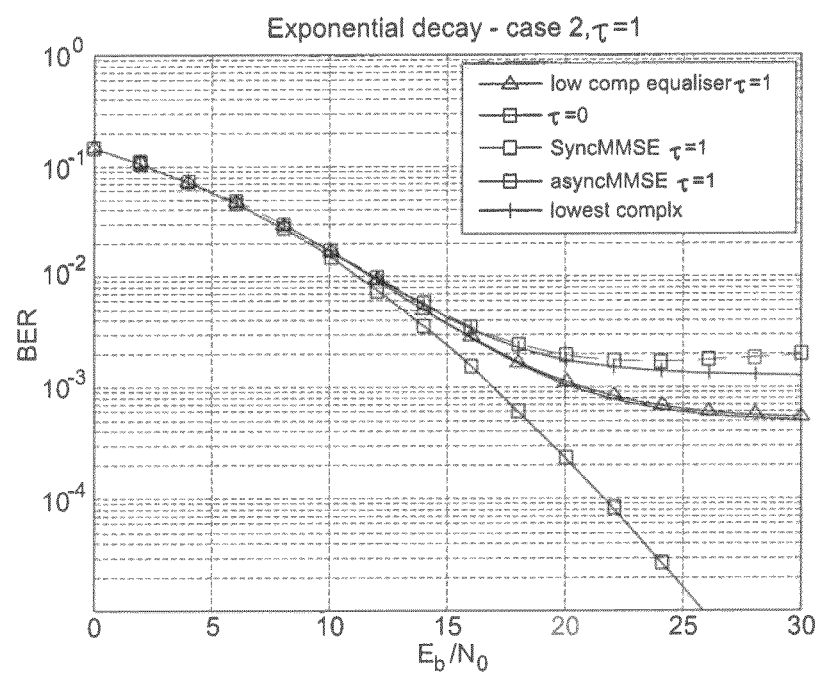
FIG. 11 compares the performance of a known synchronised MMSE equaliser with the performance of a third asynchronous MMSE equaliser in accordance with the present invention, for sixteen users transmitting on exponentially decay channels, wherein fifteen user signals are received before the signal received from a synchronised user.

FIGS. 3 to 11 show that at high SNR, when the interference from MUI and IBI dominates, the proposed MMSE Equaliser can effectively suppress the interference. FIG. 6 illustrates a case where an equaliser operating according to equation (6) on signals received via i.i.d. Rayleigh fading channels, where the received signals of all the other users arrive before the synchronized user by a delay of τ=4. At a signal to noise ration of 30 dB the BER performance obtained by using the proposed MMSE equaliser ('asyncMMSE equaliser') is $3 \times 10^{-4}$, compared to that using the conventional MMSE Equaliser ('syncMMSE equaliser') where the BER performance is $3 \times 10^{-3}$. The performance gain may be further improved by using channel coding.

Examples of the performance of the uncoded block CDMA system using the proposed low complexity equaliser ('low comp. equalizer') operating according to equation (8) are presented in FIGS. 7 to 10. It can be observed that in both the exponentially decaying channels and the i.i.d. channels that the low complexity equaliser operating according to equation (8) shows good performance with only a very slight performance degradation compared to the proposed optimal linear MMSE Equaliser operating according to equation (6) for the asynchronous block CDMA systems. The computational complexity of the low complexity equalizer, however, is greatly reduced compared to the optimal linear MMSE Equaliser for asynchronous block CDMA systems.

The invention claimed is:

1. An apparatus comprising:
    a multiple-user mean-squared error (MMSE) equaliser configured to receive signals from a number of users and to equalise signals received from the users and to operate according to:

$$\tilde{G}_S = M\sigma_{m,i}^2 F \tilde{H}_m^H F^{-1} [M^2 \sigma_{m,i}^2 F \tilde{H}_m \tilde{H}_m^H F^{-1} + M\sigma_v^2 I + W]^{-1}$$

wherein $\tilde{G}_s$ is the equaliser, M is the total number of users, $\sigma_{m,i}^2$ denotes a signal power of an ith transmitted block of a signal received from a mth user, F is the Fast Fourier Transform (FFT) matrix, $F^{-1}$ is Inverse Fast Fourier Transform (IFFT) matrix, $\tilde{H}_m$ is the P×P circulant matrix with its first column containing time domain channel taps of the mth user, where P is a block length, $\sigma_v^2$ is the noise variance, I is the P×P identity matrix and W denotes a P×P matrix allowing to take into account Multi-User Interference (MUI) and Inter-Block Interference (IBI) due to the asynchronous reception among the users;

wherein:

$$W = FD_m^H \left( \sum_{a=1}^{N_a} (\sigma_{a,i}^2 + \sigma_{a,i-1}^2)(A_{4,a}(c_a c_a^H \otimes I) A_{4,a}^H) + \sum_{b=1}^{N_b} (\sigma_{b,i}^2 + \sigma_{b,i+1}^2)(\Delta_{2,b}(c_b c_b^H \otimes I) A_{2,b}^H) \right) D_m F^{-1}$$

wherein:
    $D_m$ is the dispreading matrix for a first user;
    $N_a$ is the number of users from which signals arrive after an arrival of a signal from the first user;
    $N_b$ is the number of users from which signals arrive before the arrival of the signal from the first user;
    $\sigma_{a,i}$ and $\sigma_{b,i}$ denote the signal power of the ith transmitted block of the ath and bth user respectively;
    $A_{4,a}$ is an upper triangular Toeplitz matrix with first row being $[0_{1 \times MP-(L-1+\tau_a-L_{CP})}\ h_a(L-1) \ldots h_a(L_{CP}-\tau_a+1)]$;
    $\Delta_{2,b}$ is a lower triangular Toeplitz matrix with the first column being $[0_{1 \times MP-\tau_b}, -h_b(0), \ldots, -h_b(\tau_b-1)]^T$;
    L is the channel length;
    $\tau_a$ is a delay between receipt of a signal from the ath user and of a corresponding signal from the synchronized user;
    $\tau_b$ is a delay between receipt of a signal from the bth user and of a corresponding signal from the synchronized user;
    $L_{CP}$ is the length of a cyclic prefix used;
    $h_a(i)$ and $h_b(i)$ denote the ith channel tap for the ath and bth user respectively;

$c_a$ and $c_b$ are the spreading codes for the ath and bth users respectively; and ⊗ denotes the Kronecker product.

2. An apparatus according to claim 1, further arranged so that said operation is for channels with independent and identically distributed channel impulse response taps.

3. An apparatus comprising:

a multiple-user mean-squared error (MMSE) equaliser configured to receive signals from a number of users and to equalise signals received from the users and to operate according to:

$$\tilde{G}_S = M\sigma_{m,i}^2 F \tilde{\tilde{H}}_m^H F^{-1} [M^2 \sigma_{m,i}^2 F \tilde{\tilde{H}}_m \tilde{\tilde{H}}_m^H F^{-1} + M\sigma_v^2 I + W]^{-1}$$

wherein $\tilde{G}_S$ is the equaliser, M is the total number of users, $\sigma_{m,i}^2$ denotes a signal power of an ith transmitted block of a signal received from a mth user, F is the Fast Fourier Transform (FFT) matrix, $F^{-1}$ is Inverse Fast Fourier Transform (IFFT) matrix, $\tilde{\tilde{H}}_m$ is the P×P circulant matrix with its first column containing time domain channel taps of the mth user, where P is a block length, $\sigma_v^2$ is the noise variance, I is the P×P identity matrix and W denotes a P×P matrix allowing to take into account Multi-User Interference (MUI) and Inter-Block Interference (IBI) due to the asynchronous reception among the users;

wherein:

$$W = F\left(\sum_{a=1}^{N_a} \Upsilon_a + \sum_{b=1}^{N_b} \Xi_b\right) F^H$$

wherein:

$\Upsilon_a$ is a diagonal matrix of size P×P, with first $l_{1,a}$ diagonal elements being $\alpha_{h_a}^2(0), \ldots \alpha_{h_a}^2(l_{1,a}-1)$, and the rest being zeros where $l_{1,a} = L - L_{CP} + \tau_a - 1$;

$$\alpha_{h_a}^2(l) = (\sigma_{a,i}^2 + \sigma_{a,i-1}^2) \sum_{i=0}^{l_{1,a}-l-1} h_a(L-1-i)h_a^*(L-1-i)$$

$\Xi_b$ is a diagonal matrix with last $\tau_b$ diagonal elements being $\beta_{h_b}^2(0), \ldots, \beta_{h_b}^2(\tau_b-1)$;

$$\alpha_{h_a}^2(l) = (\sigma_{a,i}^2 + \sigma_{a,i-1}^2) \sum_{i=0}^{l_{1,a}-l-1} h_a(L-1-i)h_a^*(L-1-i)$$

$N_a$ is the number of users from which signals arrive after an arrival of a signal from a first user;

$N_b$ is the number of users from which signals arrive before the arrival of the signal from the first user;

$\sigma_{a,i}$ and $\sigma_{b,i}$ denote the signal power of the ith transmitted block of the ath and bth user respectively;

L is the channel length;

$\tau_a$ is a delay between receipt of a signal from the ath user and of a corresponding signal from the first user;

$\tau_b$ is a delay between receipt of a signal from the bth user and of a corresponding signal from the first user;

$h_a$ (i) denotes the ith time domain channel tap of the channel experienced by the ath user; and $h_b$ (j) denotes the jth time domain channel tap of the channel experienced by the bth user.

4. An apparatus according to claim 1, wherein W is a matrix having non-zero diagonal components and zero off-diagonal components, the diagonal components all being the same.

5. A MMSE equaliser according to claim 3, wherein:

$$W = \xi I$$

with $\xi$ being the average of the diagonal elements of $\Upsilon_a$ and $\Xi_b$.

6. A method of equalising signals received in a block spreading code division multiple access (CDMA) system, the method performed in an equaliser and comprising equalising a plurality of asynchronously received signals by taking time delays between said received signals into account during the equalisation, wherein said signals are equalised according to:

$$\tilde{G}_S = M\sigma_{m,i}^2 F \tilde{\tilde{H}}_m^H F^{-1} [M^2 \sigma_{m,i}^2 F \tilde{\tilde{H}}_m \tilde{\tilde{H}}_m^H F^{-1} + M\sigma_v^2 I + W]^{-1}$$

wherein $\tilde{G}_S$ is the equaliser, M is the total number of users, $\sigma_{m,i}^2$ denotes the signal of an ith transmitted block of the mth user, F is the Fast Fourier Transform (FFT) matrix, $F^{-1}$ is Inverse Fast Fourier Transform (IFFT) matrix, $\tilde{\tilde{H}}_m$ is the P×P circulant matrix with its first column containing time domain channel taps of the mth user, where P is a block length, $\sigma_v^2$ is the noise variance, I is the P×P identity matrix and W denotes a P×P matrix allowing to take into account Multi-User Interference (MUI) and Inter-Block Interference (IBI) due to the asynchronous reception among the users;

wherein:

$$W = FD_m^H \left( \begin{array}{l} \sum_{a=1}^{N_a} (\sigma_{a,i}^2 + \sigma_{a,i-1}^2)(A_{4,a}(c_a c_a^H \otimes I)A_{4,a}^H) + \\ \sum_{b=1}^{N_b} (\sigma_{b,i}^2 + \sigma_{b,i+1}^2)(\Delta_{2,b}(c_b c_b^H \otimes I)\Delta_{2,b}^H) \end{array} \right) D_m F^{-1}$$

wherein:

$D_m$ is the dispreading matrix for a first user;

$N_a$ is the number of users from which signals arrive after an arrival of a signal from the first user;

$N_b$ is the number of users from which signals arrive before the arrival of the signal from the first user;

$\sigma_{a,i}$ and $\sigma_{b,i}$ denote the signal power of the ith transmitted block of the ath and bth user respectively;

$A_{4,a}$ is an upper triangular Toeplitz matrix with first row being $[0_{1 \times MP-(L-1+\tau_a-L_{CP})} h_a(L-1) \ldots h_a(L_{CP}-\tau_a+1)]$;

$\Delta_{2,b}$ is a lower triangular Toeplitz matrix with the first column being $[0_{1 \times MP-\tau_b}, -h_b(0), \ldots, -h_b(\tau_b-1)]^T$;

L is the channel length;

$\tau_a$ delay between receipt of a signal from the ath user and of a corresponding signal from the first user;

$\tau_b$ is a delay between receipt of a signal from the bth user and of a corresponding signal from the first user;

$L_{CP}$ is the length of a cyclic prefix used;

$h_a$ (i) and $h_b$ (i) denote the ith channel tap for the ath and bth user respectively;

$c_a$ and $c_b$ are the spreading codes for the ath and bth users respectively; and ⊗ denotes the Kronecker product.

7. A method according to claim 6, wherein said signals are equalised for channels with independent and identically distributed channel impulse response taps.

8. A method of equalising signals received in a block spreading code division multiple access (CDMA) system, the method performed in an equaliser and comprising equalising a plurality of asynchronously received signals by taking time delays between said received signals into account during the equalisation, wherein said signals are equalised according to:

$$\tilde{G}_s = M\sigma_{m,i}^2 F \tilde{\tilde{H}}_m^H F^{-1} [M^2 \sigma_{m,i}^2 F \tilde{\tilde{H}}_m \tilde{\tilde{H}}_m^H F^{-1} + M\sigma_v^2 I + W]^{-1}$$

wherein $G_s$ is the equaliser, M is the total number of users, $\sigma_{m,i}^2$ denotes a signal power of an ith transmitted block of the mth user, F is the Fast Fourier Transform (FFT) matrix, $F^{-1}$ is Inverse Fast Fourier Transform (IFFT) matrix, $\tilde{\tilde{H}}_m$ is the P×P circulant matrix with its first column containing time domain channel taps of the mth user, where P is a block length, $\sigma_v^2$ is the noise variance, I is the P×P identity matrix and W denotes a P×P matrix allowing to take into account Multi-User Interference (MUI) and Inter-Block Interference (IBI) due to the asynchronous reception among the users;

wherein:

$$W = F\left(\sum_{a=1}^{N_a} \Upsilon_a + \sum_{b=1}^{N_b} \Xi_b\right) F^H$$

wherein:

$\Upsilon_a$ is a diagonal matrix of size P×P, with the first $l_{1,a}$ diagonal elements being $\alpha_{h_a}^2(0), \ldots \alpha_{h_a}^2(l_{1,a}-1)$, and the rest being zeros, where $l_{1,a} = L - L_{CP} + \tau_a - 1$, with $$\alpha_{h_a}^2(l) = (\sigma_{a,i}^2 + \sigma_{a,i-1}^2) \sum_{i=0}^{l_{1,a}-l-1} h_a(L-1-i)h_a^*(L-1-i);$$

$\Xi_b$ is a diagonal matrix with the last $\tau_b$ diagonal elements being $$\beta_{h_b}^2(0), \ldots, \beta_{h_b}^2(\tau_b - 1),$$

where $\beta_{h_b}^2(i) = (\sigma_{b,i}^2 + \sigma_{b,i-1}^2) \sum_{j=0}^{i} h_b(j) h_b^*(j);$ $N_a$ is the number of users from which signals arrive after an arrival of a signal from the a first user;

$N_b$ is the number of users from which signals arrive before the arrival of the signal from the first user;

$\sigma_{a,i}$ and $\sigma_{b,i}$ denote the signal power of the ith transmitted block of the ath and bth user respectively;

L is the channel length;

$\tau_a$ is a delay between receipt of a signal from the ath user and of a corresponding signal from the first user;

$\tau_b$ is a delay between receipt of a signal from the bth user and of a corresponding signal from the first user;

$h_a$ (i) denotes the ith time domain channel tap of the channel experienced by the ath user; and $h_b$ (j) denotes the jth time domain channel tap of the channel experienced by the bth user.

9. A method according to claim 6, wherein:

$$W = \xi I$$

with $\xi$ being the average of the diagonal elements of $\Upsilon_a$ and $\Xi_b$.

* * * * *